No. 747,371. PATENTED DEC. 22, 1903.
H. W. BROCKETT.
TROLLEY WHEEL.
APPLICATION FILED JUNE 23, 1903.
NO MODEL.
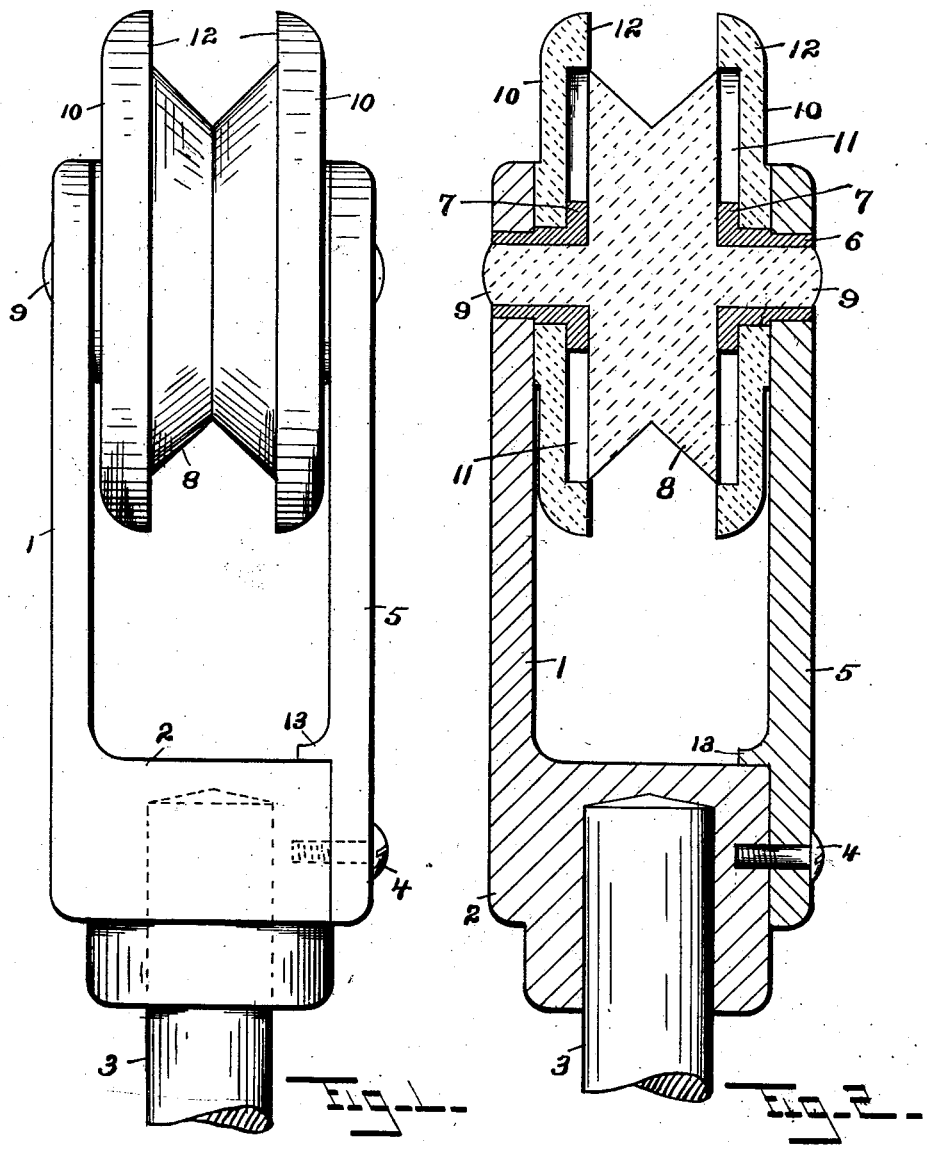
Witnesses
Inventor.
Herbert W. Brockett
Attorney.

No. 747,371. Patented December 22, 1903.

UNITED STATES PATENT OFFICE.

HERBERT W. BROCKETT, OF HAMDEN, CONNECTICUT, ASSIGNOR OF ONE-HALF TO THE EAST HAMPTON BELL COMPANY, OF EAST HAMPTON, CONNECTICUT, A CORPORATION OF CONNECTICUT.

TROLLEY-WHEEL.

SPECIFICATION forming part of Letters Patent No. 747,371, dated December 22, 1903.

Application filed June 23, 1903. Serial No. 162,720½. (No model.)

*To all whom it may concern:*

Be it known that I, HERBERT W. BROCKETT, a citizen of the United States, residing at Hamden, in the county of New Haven and State of Connecticut, have invented certain new and useful Improvements in Trolley-Wheels, of which the following is a specification, reference being had therein to the accompanying drawings.

My invention relates to improvements in trolley-wheels, and has for its object, among other things, to provide a device of this character that will prevent the displacement of the trolley from the wire or conductor, and, further, to construct the same of few parts, which can be economically constructed and readily assembled.

To these and other ends my invention consists in the trolley-wheel having certain details of construction and combination of parts, as will be hereinafter described, and more particularly pointed out in the claims.

Referring to the drawings, in which like numerals designate like parts in both figures, Figure 1 is an elevation of my device complete, and Fig. 2 is a sectional elevation thereof.

In the drawings the numeral 1 designates one of the yoke-arms having a lateral lug 2 upon the bottom end thereof, within which is secured the upper end of the trolley-pole 3. Secured to this lug by the screws 4, parallel with the yoke-arm 1, is the separable yoke-arm 5. Endwise movement of this yoke-arm upon the lug is prevented in one direction by the shoulder-lug 13. Each of the yoke-arms 1 and 5 are provided with bushings 6 6, having the heads 7 thereon, which bushings may be secured against rotation by friction or any of the other common means well known to the art. Between the inner faces of the bushings 6 is the grooved trolley 8, having a pinion-shaft 9 projecting laterally from either side thereof and rotatably mounted within the said bushings. This shaft is shown in the drawings as being made integral with the trolley; but I do not limit myself to such construction, as it may be separate, if desired. Rotatably mounted upon the bushings 6 between the heads 7 and the inner faces of the yoke-arms 1 and 5 are the disks 10, having oppositely-disposed recesses 11 of substantially the same diameter as the outside diameter of the trolley 8 and the inner faces 12 of said disks being in the same vertical plane as the outer edges of the trolley 8.

In operation the trolley-wire is within the groove in the face of the trolley 8, which rotates freely between the disks 10. If while in operation the trolley for any reason runs off the wire, the inner faces 12 of the disks 10 abut against the wire and prevent the wheel from disengagement with the wire, but forces the same back again into the groove of the trolley. The disks remain rigid at all times except when they abut against the wire, when the friction rotates them slightly and reduces the possibility of wear to the minimum.

There are minor changes and alterations that can be made within my invention aside from those herein shown and described, and I would therefore have it understood that I do not limit myself to the exact construction herein shown and described, but claim all that falls fairly within the spirit and scope of my invention.

Having described my invention, what I claim as new, and desire to secure by Letters Patent, is—

1. In a device of the character described, the combination with a yoke having two parallel arms; a bushing in each of said arms; a trolley-wheel rotatably mounted in said bushings between said arms; and a disk rotatably mounted upon said bushings upon either side of said trolley-wheel, substantially as shown and described.

2. In a device of the character described, the combination with a yoke having two parallel arms; a bushing in each of said arms, said bushings being provided at their inner ends with an enlarged head; a trolley-wheel rotatably mounted in said bushings between said arms; and disks rotatably mounted upon said bushings between the said enlarged head and the yoke-arms and upon either side of said trolley-wheel, substantially as shown and described.

In testimony whereof I affix my signature in presence of two witnesses.

HERBERT W. BROCKETT.

Witnesses:
GEORGE E. HALL,
FLORENCE H. MONK.